Sept. 20, 1938.  J. B. WEBB  2,130,433
EQUALIZING DRIVE FOR CONVEYER SYSTEMS
Filed Oct. 17, 1934  3 Sheets-Sheet 1

INVENTOR.
JERVIS B. WEBB
BY
Joseph Farley
ATTORNEY.

Sept. 20, 1938. J. B. WEBB 2,130,433
EQUALIZING DRIVE FOR CONVEYER SYSTEMS
Filed Oct. 17, 1934 3 Sheets-Sheet 3

INVENTOR.
JERVIS B. WEBB
BY Joseph Farley
ATTORNEY.

Patented Sept. 20, 1938

2,130,433

UNITED STATES PATENT OFFICE 2,130,433

EQUALIZING DRIVE FOR CONVEYER SYSTEMS

Jervis B. Webb, Royal Oak, Mich.

Application October 17, 1934, Serial No. 748,643

17 Claims. (Cl. 198—203)

This invention relates to conveyer systems used in modern manufacturing plants, and wherein a continuously operating endless conveyer consisting of a driven chain and load carrying trolleys transports articles from one part of a manufacturing plant to another. During this transportation various manufacturing operations are performed by workmen located at various stations along the line of travel of the conveyer. As in some instances the length of such a conveyer system is too great to be driven effectively by a single drive it is desirable to employ several separate driving units located at intervals along the conveyer's line of travel. While the use of a plurality of drives located at spaced points, overcomes the objection of concentrating the entire driving load on a single drive, it introduces other problems, the solution of which have proven very difficult. It is necessary that the speed of the units be synchronized and also to have some means of compensation for variation in the length of the chain between stations. It is obvious that, although the separate units may be set in operation at the same speed, there is no assurance that each unit will continue to take an equal share of the load. If conveyer chains could be relied upon to maintain a constant length between stations, an equal share of the load taken by each unit would be much easier to maintain. However, any slack in the chain accumulated between units, or the momentary jamming at a certain section, and many other factors, may cause a variation in the length of the chain between stations. It is evident that if any such variation in length occurs the load will be unequally distributed between the several units.

It is one of the objects of this invention to provide a driving unit of which the driving effort and speed may be varied in such a way as to compensate for variation in the length of chain between stations thereby to cause the load to be more equally taken up by the several driving units.

In Patent No. 1,847,152 issued March 1, 1932 there is described a driving unit particularly adaptable to certain types of installation but which however has ceratin limitations. In view of such limitations it is a further object of the present invention to provide an improved driving unit capable of being used for installations for which the unit described in said patent would not be applicable.

Considered more specifically it is another object of this invention to provide a driving unit construction adapted for driving a sprocket, the teeth of which mesh with the chain links, and in which driving unit means are incorporated for automatically varying the speed of such unit relatively to the other driving units and as a result its driving effect in accordance with the torque exerted by the sprocket driven by the unit.

The above and other objects of the invention will appear more fully from the following more detailed specification and by reference to the accompanying drawings forming a part hereof, and wherein.

Figure 1:
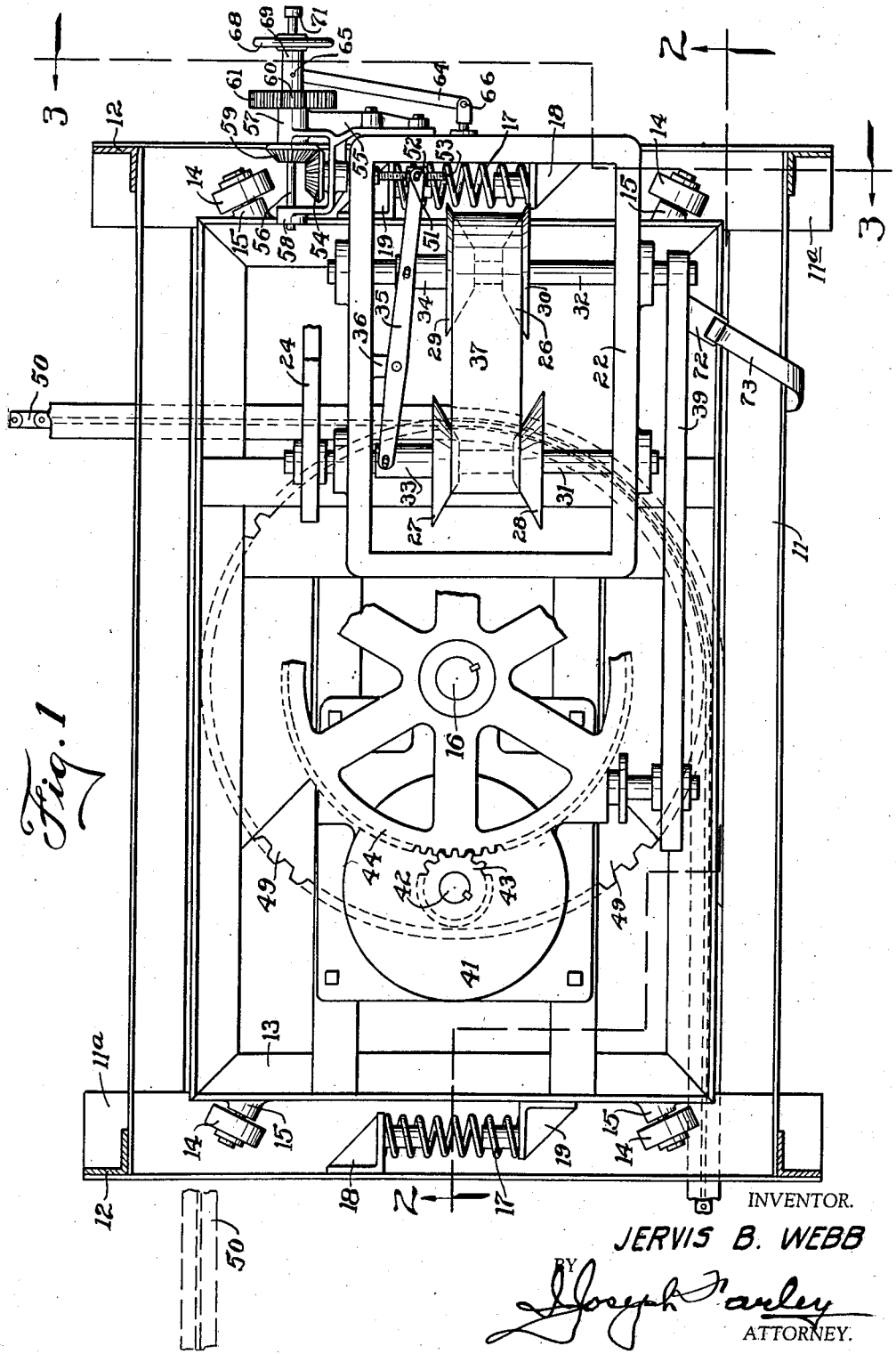
Fig. 1 is a plan view, partly in section of one of the driving units for a conveyer system of the type above set forth, and constructed in accordance with the principles of the present invention.

The unit shown in the drawings is one driving unit for an endless conveyer of the type hereinbefore described. The unit may be assumed as one of several located at advantageous points in a manufacturing plant and cooperating to drive an endless conveyer system which may be several hundred feet in length.

The main supporting frame, designated in the drawings by the reference character 11, supports the entire unit from the ceiling, floor or other suitable structure. The frame 11 is preferably constructed of a plurality of angle or other structural members, the legs or webs of which are arranged to form a horizontal supporting surface 11ª. The frame is supported and held stationary by the standards or brackets 12, which are indicated in the drawings as extending to a ceiling support not shown.

A second and entirely separate frame 13, also preferably constructed of structural steel or iron members, forms the base for supporting the driving unit, the details of which will be later set forth more fully. A plurality of rollers 14, suitably mounted on stub shafts 15 connected to the frame 13, serve to support said frame and the entire driving unit so that it will be free to turn relative to frame 11 about a vertical axis near the center of the frame 11. The frame 13 is also guided in its turning movement by a shaft 16 journaled in a manner to be described and the turning of frame 13 may be restricted by springs 17 interposed between suitably designed brackets 18 and 19, the brackets 18 being secured to frame 11 and brackets 19 to frame 13.

As will be apparent from the foregoing the driving unit and frame are mounted with a certain freedom of rotation about shaft 16, restricted by springs 17. Any suitable driving or power unit such as the electric motor 20 is mounted on bracket or pedestal 21 which in turn is carried by a supporting frame 22, the latter being secured to frame 13. Secured upon the armature shaft of the motor 20 is a driving pulley 23 connected by a belt or other drive 24 to a pulley 25 keyed upon the input shaft of any suitable variable speed mechanism such as a well known Reeves drive 26. This drive is supported upon the supporting frame 22 secured to frame 13 and said drive in accordance with the usual construction of such devices consists of a driving pair of cone shaped pulleys 27—28 and a driven pair of cone shaped pulleys 29—30, mounted on shafts 31 and 32 respectively. The pulleys 27, 29 are adjustable axially on their shafts under the control of sleeves 33, 34 respectively connected to a lever 35 pivotally mounted on bracket 36. It is evident that, for example, clockwise movement of the lever 35 upon its pivotal connection to the bracket 36 will cause the pulley 27 to be moved away from its cooperating pulley 28 and the pulley 29 to be moved towards pulley 30 which causes belt 37 to operate on the driving and driven pulley at different effective diameters of such pulleys. This relative change in working diameters of the driving and driven pulleys on which the belt operates is the means of controlling the speed relation between said pulleys as it is evident that clockwise rotation of lever 35 around pivotal bracket 36 will cause a decrease in effective working diameter on driving pulleys 27—28 and an increase in the effective working diameter of driven pulleys 29—30, and conversely counterclockwise movement of lever 35 will produce decrease of effective working diameter of pulleys 29—30 and an increase in diameter of 27—28. Or since the relative working diameter controls the speed relation, a clockwise movement of lever 35 will decrease the speed of the driven pulley and counterclockwise movement will produce the opposite result, namely, increase in speed.

We have now traced the drive to the driven shaft 32 of the Reeves drive unit and to the end of this shaft 32 is secured a pulley 38 (see Fig. 2) over which runs a belt 39 to transmit the drive to a pulley 40 secured in the conventional manner to shaft 40ª of gear box 41. Said gear box 41 encloses gearing of a type suitable to the purpose of transmitting the drive from pulley 40 to vertical shaft 42 and spur gear 43, such gear units being well known in the art for rotatably joining shafts which rotate at right angles to each other such as shafts 40ª and 42. It is also apparent that appropriate gear reductions may also be incorporated in this gear 41 in the conventional manner. The drive is transferred next to shaft 16 through the gears 43 and 44 as shown best in plan view in Fig. 1. As shown in Fig. 2 the shaft 16 is journaled in bearings 45, 46 and 47; the bearing 45 being secured to gear box 41 and thereby indirectly to frame 13; and bearing 46 being also secured to frame 13. However, the bearing 47 is secured to frame 11, the stationary frame, and also on frame 11 concentric with bearing 47 is secured turning surface or bearing 48 which surface serves as a vertical central support for the entire unit on frame 13 which has a limited freedom of rotation about the vertical axis of shaft 16. As previously described the frame 13 is supported at its four corners on rollers 14 which bear on frame 11 and at the center on bearing surface 48, making in all five points of support.

At the lower end of shaft 16, as shown in Fig. 2, the sprocket wheel 49 is secured to provide a driving connection to the main chain 50 of the conveyer system.

From the foregoing description of the unit it will be evident that when it is put in operation to exert a driving force by operation of the teeth in sprocket 49 against the links of chain 50, the whole driving unit supported on frame 13 will tend to rotate about shaft 16 as an axis and will be checked in this rotation by springs 17 and the amount of this allowed rotation or so-called angular deflection will be in proportion to the driving force exerted, i. e. a large force will create a large angular deflection and a smaller force a deflection smaller in proportion. Also the amount of angular deflection allowed for given conditions may be defined and controlled by the design of springs 17 since their stiffness will control the deflection allowed.

Figure 2:
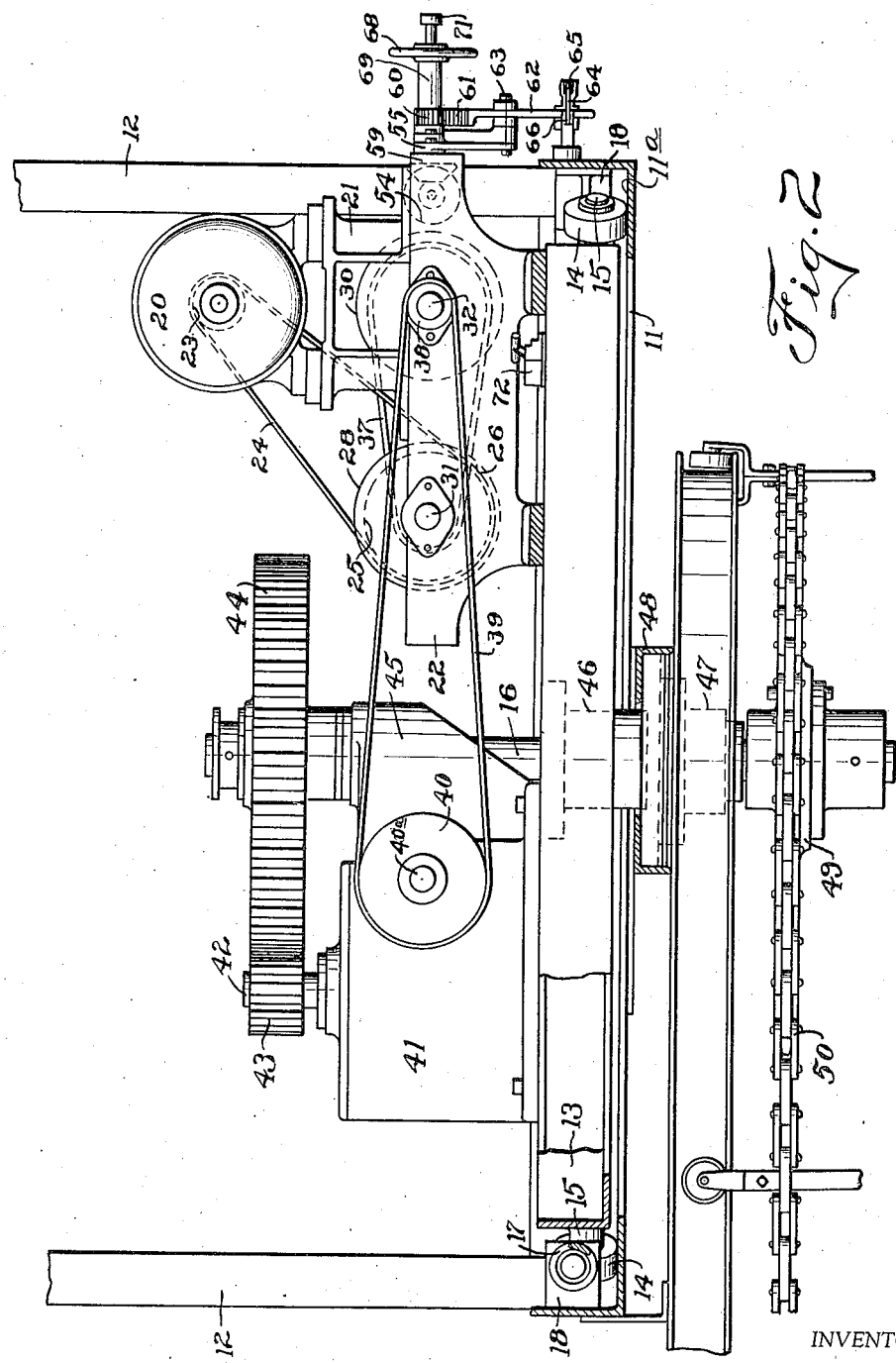
Fig. 2 is a section taken on line 2—2 of Fig. 1.
Figure 3:
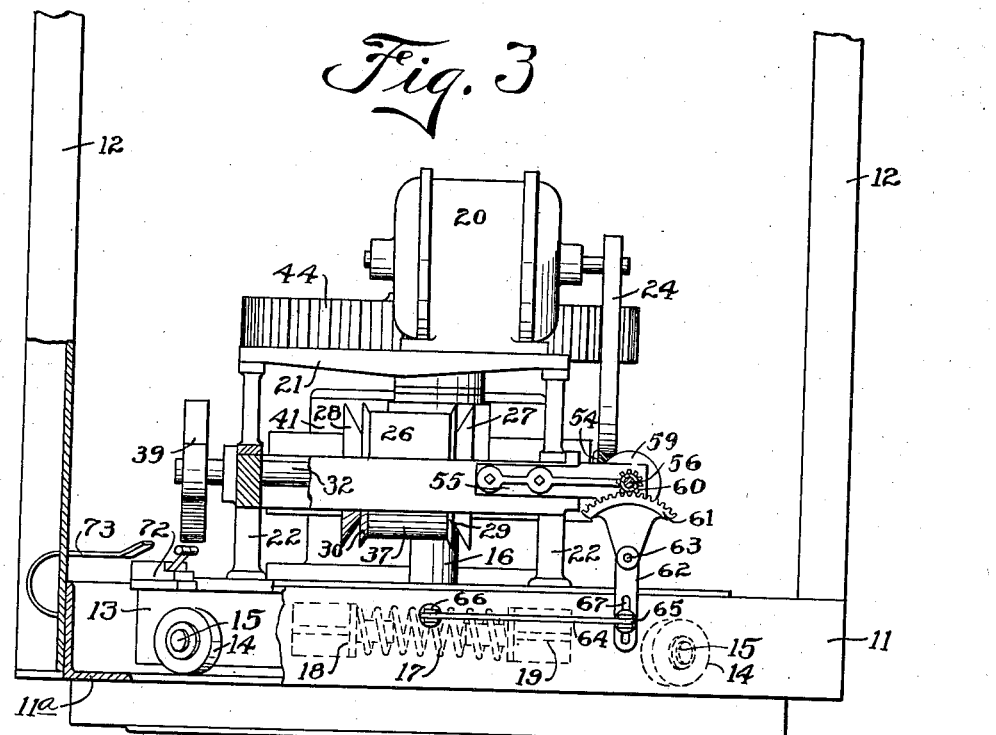
Fig. 3 is a section on line 3—3 of Fig. 1.

The above may be more clearly understood by reference to Fig. 1 and assuming that the sprocket 49 is being rotated by the driving mechanism in a counterclockwise direction and remembering that the entire driving unit for the sprocket is supported on frame 13 which is only held from rotation about shaft 16 as an axis by springs 17. Therefore, if the sprocket 49 is to be driven counterclockwise by a unit located on frame 13 the said frame 13 will tend to rotate in a clockwise direction and this tendency will be balanced by springs 17 which will deflect in proportion to the load.

This angular deflection of the frame 13 in proportion to load transmitted to the conveyer chain is used to adjust the Reeves drive 26, previously described so that the variations in load are immediately compensated for by a variation in the mechanical advantage of the drive. This may be accomplished by connecting the end of lever 35 so that it remains fixed relative to the movement of frame 13 so that any deflection of said frame 13 will cause movement of the lever 35 and therefore change the relative effective working diameters of pulleys 27—28 and 27—30 of the Reeves drive unit. Specifically this is accomplished by a nut 51 mounted to a swivel in fork 52 at the end of lever 35, said nut 51 being engaged with a threaded shaft 53 which is journaled in support frame 22 with bevel gear 54 secured at its inner end as shown. A bracket 55 is secured to frame 22 and bearings 57 and 58 for shaft 56 provided therein, said shaft 56 carrying a bevel gear 59 which meshes with the bevel gear 54. Also keyed to shaft 56 is a spur gear 60 which meshes with a gear sector 61 formed at the end of a lever 62, which is fulcrumed on a pin 63 supported by bracket 55. At the opposite end of lever 62 an arm 64 completes the linkage by effecting a connection between lever 62 and frame 11, suitable universal joints 65 and 66, as well as adjusting slot 67, being provided.

Considering the linkage just described it is apparent that any deflection of frame 13 will cause movement of lever 62 and therefore rotate shaft 56 through gear sector 61 and gear 60, which rotation is imparted to thread shaft 53 through bevel gears 59 and 54 and causes movement of nut 51 and therefore the end of lever 35.

In addition to the above a hand wheel 68 is provided for manual adjustment when desired, comprising a sleeve connecting hand wheel 68 directly with gear 60, said sleeve and gear unit being free to slide axially on shaft 56 although rotatably secured to said shaft. It is possible with this construction to slide hand wheel 68 against a stop 71 provided thereby disconnecting gear 60 from sector 61 and allowing the handwheel to be rotated thus changing the setting of the Reeves drive relative to the control linkage. When the desired adjustment is accomplished the wheel is again returned to the position shown in Fig. 1 with gear 60 meshed with sector 61.

Another feature of my invention is the provision of a limit switch 72 and an actuating arm 73, the switch 72 being secured to frame 13 and the arm 73 to frame 11 so that when a very heavy load is thrown on the conveyer and the frame 13 deflects to an extreme position, the arm 73 will act to open switch 72 which is connected in the circuit of motor 20 and will therefore cause the motor to stop and thereby avert possible breakage of the conveyer chain or other detrimental result.

Figure 4:
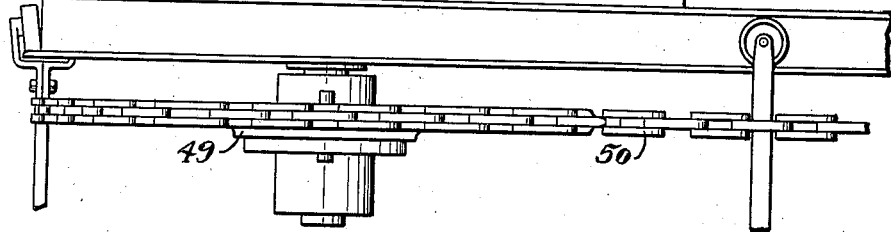
Fig. 4 is a plan view showing one corner of the unit in plan view with the spring compressed and the inner frame turned as might occur with a heavy driving load.
Figure 4:
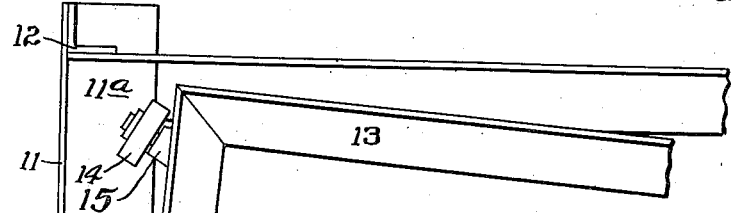

With the conveyer system in operation there will be a plurality of the above described driving units located at various points in the system. Considering the operation of one of these driving units it is evident that rotation of frame 13 and deflection of springs 17 will be in proportion to the amount of load, or more specifically, to the amount of torque exerted about shaft 16, and with a considerable load the relative positions of frames 11 and 13 might be as shown in Fig. 4, with a relatively large angular deflection of the frame 13. As has been previously set forth in detail this large load and consequent deflection causes automatic adjustment of the Reeves drive through the linkage described so that the speed of sprocket 49 will be momentarily decreased and a part of the load required to be taken by the other units in the system. Conversely if slack comes in the chain near one of the units, a less deflection of the frame 13 will be maintained and the Reeves drive will immediately speed up the sprocket 49 until the unit is again taking its share of the load. By means of the hand wheel 68 it is possible to adjust each unit so that the adjustment will operate in the desired range.

Also in order that the system may not work toward a gradual increase or decrease of speed of the whole system, one unit is generally used as a "pacemaker" or "master unit" and driven at a constant desired speed. With one such unit in the system the others operate to equalize each other and maintain the desired speed of the entire conveyer system.

The particular constructional examples herein disclosed have been selected merely as illustrative of the principles of the invention and not as limiting the invention to the specific details selected for illustration. It will therefore be understood that many changes, variations and modifications may be resorted to without departing from the principles of my invention.

I claim:

1. The combination with an endless conveyer chain of a plurality of driving units located at spaced intervals along said chain in driving relationship therewith, each of said units being mounted upon a frame having limited rotative movement in a direction produced by the reaction of said driving units against said chain and means for limiting rotation of said frames in the direction of travel of said chain to hold each of said driving units with a predetermined driving pressure against said chain.

2. A driving unit for an endless conveyer chain comprising a supporting frame, a base mounted on said frame for restricted rotation in a plane parallel to the direction of travel of said chain, driving means carried by said base including a variable speed device and means operatively associated with said base and frame for producing a variation of said variable speed device upon relative movement between said frame and base.

3. The combination with an endless conveyer chain of a master driving unit having a means to adjust its speed and maintain it at a predetermined rate, and a plurality of auxiliary driving units, each including a motor, a driven shaft and a sprocket for driving said chain controlled by a variable speed device adapted to be set to operate at the same rate of speed as said master unit, one or more of said auxiliary units including a stationary frame, a frame having limited rotative movement relative to said stationary frame about the axis of said driven shaft, a pressure responsive device interposed between said frames, and means operatively associated therewith to operate said variable speed device to control the speed of said motor, said driven shaft and said sprocket of said auxiliary unit in accordance with variations from a predetermined amount of pressure exerted by said auxiliary unit upon said chain thereby to equalize the pressure exerted by each of said auxiliary units.

4. A driving unit for an endless conveyer chain comprising a stationary frame, a movable frame carried by said stationary frame, a drive shaft and driving means therefor mounted upon said movable frame, said movable frame having angular movement about the axis of rotation of said drive shaft, said driving means including a variable speed gear and means automatically responsive to variations in the driving effect of said drive shaft for varying said variable speed gear.

5. A driving unit for an endless conveyer chain comprising a stationary frame, a movable frame carried by said stationary frame, a drive shaft and driving means therefor mounted upon said movable frame and said movable frame having angular movement about the axis of rotation of said drive shaft, said driving means including a variable speed gear and means automatically responsive to variations in the driving effect of said drive shaft for varying said variable speed gear, and manually operable means for setting said variable speed device in predetermined adjusted position.

6. A driving unit for an endless conveyer chain comprising a stationary frame, a movable frame carried by said stationary frame, a drive shaft and driving means therefor mounted upon said movable frame and said movable frame having angular movement about the axis of rotation of said drive shaft, said driving means including a variable speed gear and means automatically responsive to variations in the driving effect of said drive shaft for varying said variable speed gear, and manually operable means for setting said variable speed device in predetermined adjusted position, and means for selectively placing said automatically responsive means into and out of operative position.

7. A driving unit for an endless conveyer chain comprising a stationary frame, a movable frame having a limited angular movement relative to said stationary frame, a sprocket wheel and driving means therefor mounted on said movable frame, said driving means including a variable speed gear, resilient means connected with said movable and stationary frames for normally holding said sprocket wheel with a predetermined pressure in driving relationship with said conveyer chain, and means operatively associated with said frames for automatically producing through said variable speed device a variation in speed of said sprocket wheel in accordance with variations from said predetermined pressure of the driving force exerted by said sprocket wheel upon said conveyer chain.

8. A driving unit for a conveying chain of an endless conveyer comprising a stationary frame, a frame mounted for torsional movement about a vertical axis carried by said stationary frame, a sprocket and driving means therefor carried by said movable frame, said conveying chain being in meshing engagement with said sprocket, said means for driving said sprocket including an electric motor and a variable speed gear, pressure responsive means interposed between said frames for normally holding them in a predetermined relative position, and means operatively associated with said frames and said variable speed gear for varying the driving speed of the latter automatically in accordance with variations in the relative position of said frames from said predetermined position.

9. A driving unit for an endless conveyer chain comprising a stationary frame, a movable frame carried by said stationary frame, a sprocket and driving means therefor carried by said movable frame, said endless conveyer chain being in meshing engagement with said sprocket, said means for driving said sprocket including an electric motor and a variable speed gear, pressure responsive means interposed between said frames for normally holding them in a predetermined relative position, and gearing interposed between said frames and connected with said variable speed gear for changing the adjustment of said gear.

10. A driving unit for a conveying chain of an endless conveyer comprising a stationary frame, a frame mounted for torsional movement about a vertical axis carried by said stationary frame, a sprocket and driving means therefor carried by said movable frame, said conveying chain being in meshing engagement with said sprocket, said means for driving said sprocket including an electric motor, electric switch means carried by said frames for interrupting the circuit to said motor, and pressure responsive means interposed between said frames for holding them in a predetermined position in which said switch means is closed.

11. The combination with a continuous conveyer of a plurality of driving units located at spaced intervals along said conveyer, one or more of said driving units including a driving shaft and a frame resiliently mounted for limited rotative movement around said shaft whereby said frame is rendered torsionally responsive to variations in driving load upon said shaft, and means interposed between said shaft and frame and controlled by rotative movement of said frame to vary the speed of rotation of said shaft, thereby to insure that each of said driving units will perform substantially equal driving effect.

12. The combination with an endless conveyer chain of a plurality of driving units each having a driving member in meshing engagement with the links of said chain, a driving shaft for said driving member, a frame on each of said driving units having a limited freedom of rotation about said driving shaft and having resilient means associated therewith for normally holding their respective driving members with a predetermined pressure against said chain, and a driving means controlled by rotation of said frames for effecting compensating movement of said frame and driving units relatively to said chain when the driving force exerted by said driving members exceeds a predetermined amount thereby to equalize the driving force exerted by each of said driving units.

13. The combination with an endless conveyer chain of a plurality of driving units including a master driving unit associated therewith, each of said units including a driving member in meshing engagement with the links of said chain, each of said units including a driving shaft, and with the exception of said master unit each including a frame resiliently mounted for limited rotative movement around said shaft whereby said frame is rendered torsionally responsive to change in driving load, and means interposed between said shaft and frame and controlled by rotative movement of said frame to vary the speed of rotation of said shaft and thus to effect compensating movement of its respective driving member relatively to said chain dependent upon the amount of driving force exerted by said member thereby to equalize the driving force exerted by each of said driving units.

14. The combination with an endless chain, of a master driving unit, and a plurality of auxiliary driving units located at spaced intervals along said chain, each of said auxiliary units including a driving shaft and a frame resiliently mounted for limited rotative movement around said shaft whereby said frame is rendered torsionally responsive to change in driving load, and means interposed between said shaft and frame and controlled by rotative movement of said frame to vary the speed of rotation of said shaft and thus to automatically reduce the driving pressure exerted by it on said chain whenever said pressure tends to exceed a pre-determined maximum thereby to equalize the driving pressure exerted by each of said auxiliary driving units.

15. The combination with an endless conveyer chain, of a master driving unit, and a plurality of auxiliary driving units located at spaced intervals along said chain, one or more of said auxiliary units including a driving shaft and a frame resiliently mounted for limited rotative movement around said shaft whereby said frame is rendered torsionally responsive to change in driving load, and means interposed between said shaft and frame and controlled by rotative movement of said frame to vary the speed of rotation of said shaft and thus to automatically compensate for variation in driving pressure exerted by it on said chain thereby to insure that all of said driving units will perform a substantially equal driving effect.

16. The combination with an endless conveyer chain, of a master driving unit and a plurality of auxiliary driving units arranged in driving relationship with said chain at spaced intervals along its path of travel, one or more of said auxiliary units including a driving shaft and a frame resiliently mounted for limited rotative movement around said shaft whereby said frame is rendered torsionally responsive to change in driving load, and means interposed between said shaft and frame and controlled by rotative movement of said frame to vary the speed of rotation of said shaft comprising, a variable speed device operatively associated with said frame for automatically effecting deceleration or acceleration, respectively, in the speed of each driving unit in accordance with increases or decreases of the driving force exerted by said unit on said chain thereby to equalize and distribute the driving load to the remainder of said driving units.

17. A driving unit for an endless conveyer chain comprising a stationary support, a frame having limited rotative movement relative to said support in a plane parallel to the line of travel of said conveyer chain, driving means carried by said frame including a driving member in meshing engagement with said conveyer chain, resilient means interposed between said frame and said support whereby limited rotation of said movable frame is imposed by the reaction of said driving member on said conveyer chain, and a control unit for varying the degree of driving effort of said driving means and mounted for variable actuation by rotation of said movable frame thereby to produce variation of driving effort in proportion to the degree of rotation of said movable frame.

JERVIS B. WEBB.